No. 670,411. Patented Mar. 19, 1901.
B. REEVE.
PORTABLE FARM ELEVATOR AND CAR LOADER.
(Application filed July 28, 1900.)
(No Model.) 3 Sheets—Sheet 1.
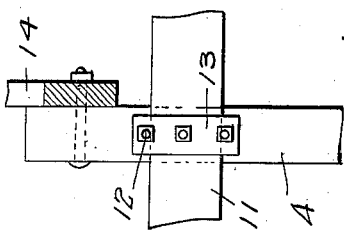
FIG. 8.
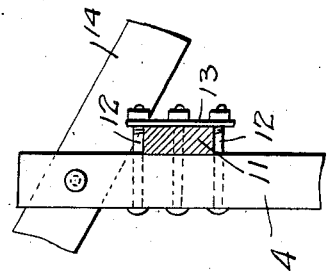
FIG. 7.
FIG. 1.
WITNESSES.
INVENTOR
BUDD REEVE
BY Paul H Hanley
HIS ATTORNEYS No. 670,411. Patented Mar. 19, 1901.
B. REEVE.
PORTABLE FARM ELEVATOR AND CAR LOADER.
(Application filed July 28, 1900.)
(No Model.) 3 Sheets—Sheet 2.

WITNESSES.
INVENTOR
BUDD REEVE
BY Paul O. Hawley
HIS ATTORNEYS.

No. 670,411. Patented Mar. 19, 1901.
B. REEVE.
PORTABLE FARM ELEVATOR AND CAR LOADER.
(Application filed July 28, 1900.)
(No Model.) 3 Sheets—Sheet 3.
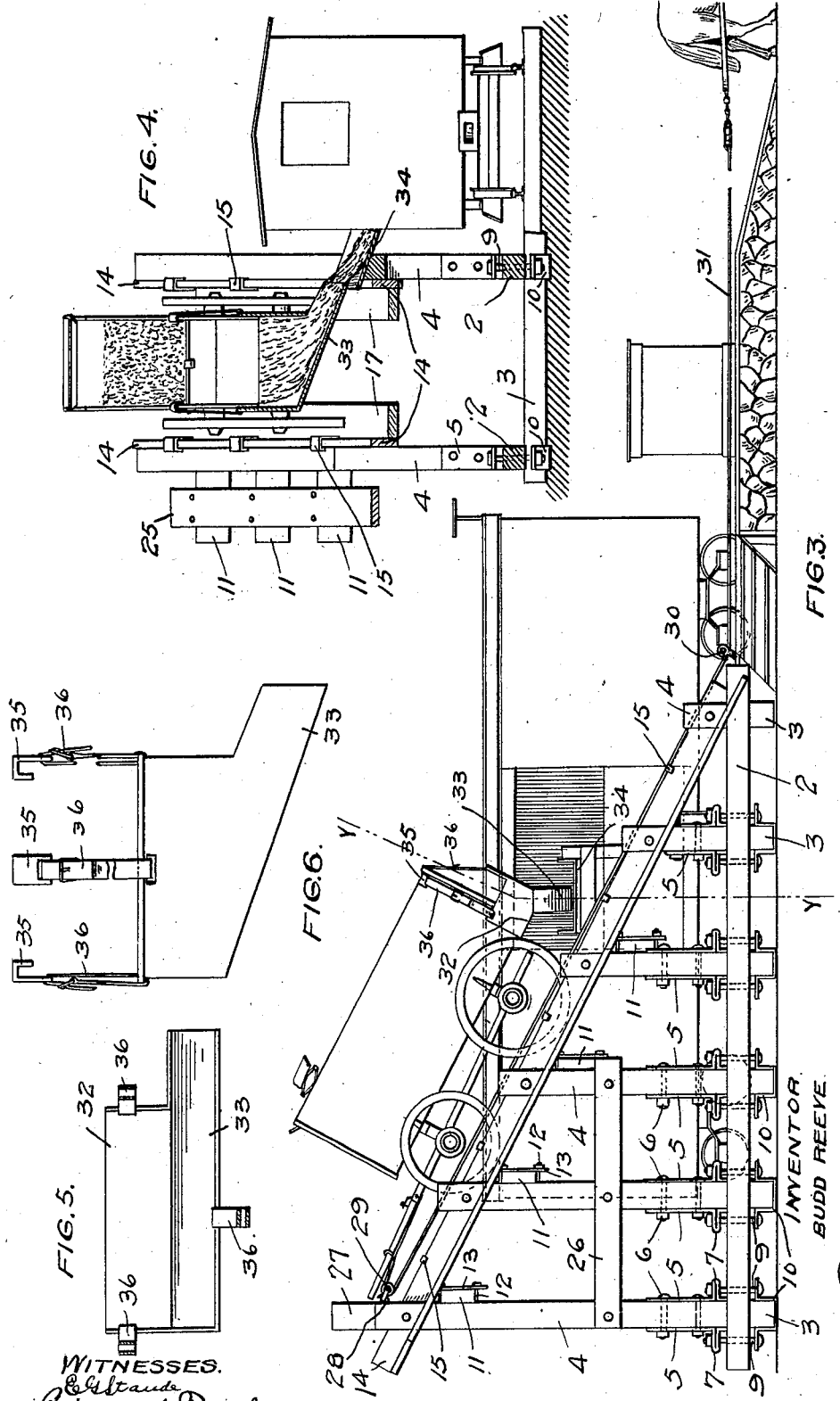
INVENTOR
BUDD REEVE
BY Paul Hawley
HIS ATTORNEYS
WITNESSES.

UNITED STATES PATENT OFFICE.

BUDD REEVE, OF BUXTON, NORTH DAKOTA.

PORTABLE FARM-ELEVATOR AND CAR-LOADER.

SPECIFICATION forming part of Letters Patent No. 670,411, dated March 19, 1901.

Application filed July 28, 1900. Serial No. 25,094. (No model.)

*To all whom it may concern:*

Be it known that I, BUDD REEVE, of Buxton, Traill county, North Dakota, have invented certain new and useful Improvements in Portable Farm-Elevators and Car-Loaders, of which the following is a specification.

My invention relates to elevating and transferring devices; and the primary object of the invention is to provide an apparatus adapted particularly for the use of farmers, whereby a load of grain, vegetables, or other farm products may without shoveling or handling be easily and quickly transferred from a wagon to a freight-car for shipment or to a granary for storage.

A further object is to provide a portable transferring apparatus which can be readily taken apart or "knocked down" for convenience in storing or moving from place to place and quickly set up beside a freight-car or granary or wherever it may be desired to transfer a load from a wagon to a car or other receptacle.

The invention consists generally in various constructions and combinations, all as hereinafter described, and particularly pointed out in the claims.

Figure 2:
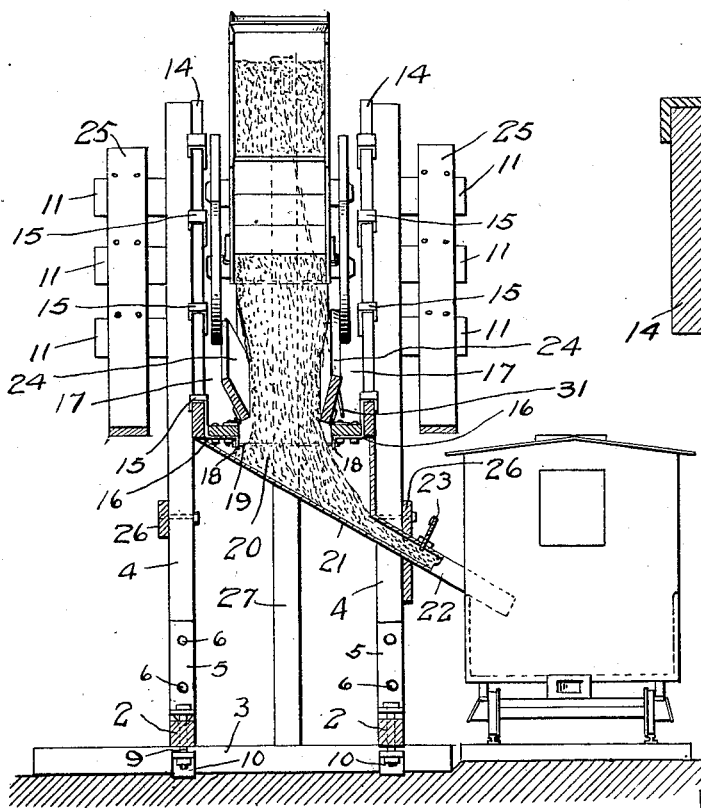
Figure 11:
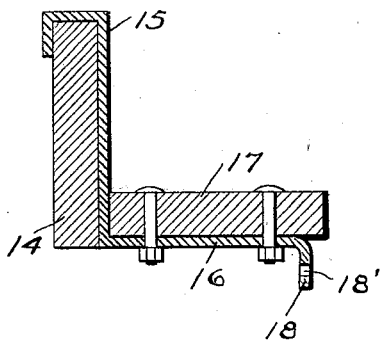
Figure 9:
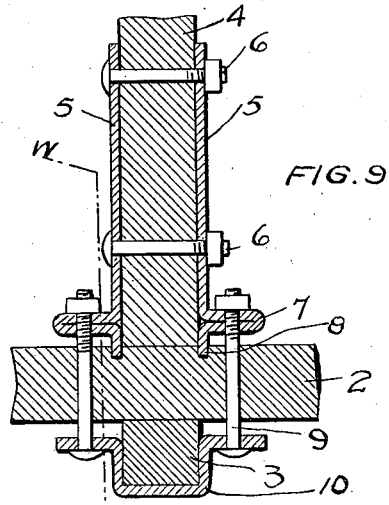
Figure 10:
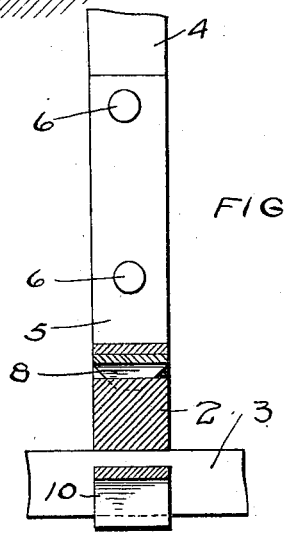

In the accompanying drawings, forming a part of this specification, Figure 1 is a side elevation of a transferring apparatus embodying my invention. Fig. 2 is a cross-section on the line $x x$ of Fig. 1. Fig. 3 is a side elevation of the apparatus reduced in size and showing the weighing-scale in position for use. Fig. 4 is a vertical section on the line $y y$ of Fig. 3. Figs. 5 and 6 are details of the end hopper or trough shown attached to the wagon in Fig. 3. Figs. 7 and 8 are details showing the method of securing the cross-timbers to the upright timbers of the frame. Fig. 9 is a section showing the means for clamping the upright and cross timbers to the sills. Fig. 10 is a sectional view on the line $w w$ of Fig. 9. Fig. 11 is a sectional view showing the method of supporting the track upon the sides of the frame.

In the drawings, 2 represents the sills, and 3 a series of cross-timbers whereon the sills are arranged. Upon the sills I provide a series of upright timbers 4, gradually increasing in length from one end of the transferring apparatus to the other. The lower ends of these timbers 4 are squared and bear firmly at all points on the top of the sills, and to enable the farmer or other operator to set up or take down the apparatus without unnecessary delay I prefer to provide a clamping device for each timber, by means of which it may be clamped on the sills. This clamp comprises the plates 5, provided upon each side of the upright timber and secured thereon by bolts 6 or in any other suitable way. Folds or bends 7 are formed in said plates near their lower ends, forming outwardly-extending lips or lugs near the lower end of the timber, and the ends 8 of said plates are preferably sharpened and extend below the end of the timber, so that when the timber is placed on the sill said ends will bear on the top of the same and prevent the timber from slipping out of its proper position thereon. Any suitable means may be provided for locking the timbers in place on the sills; but I prefer to provide the bolts 9, passing through the lugs 7 and through said sills and the ends of the yoke 10, which supports the cross-timbers 3 beneath the sills. As shown in Fig. 9, the cross-timbers 9 are preferably arranged beneath the upright timbers 4, and spaces are provided between the ends of the yoke 10 and the under surface of the sill, so that when the bolts 9 are tightened the ends 8 of the bars 5 will be drawn into the top of the sill and the lower end of the upright timber securely clamped against movement in either direction. At the same time the cross-timbers will be firmly clamped on the under surface of the sill by means of the bolts and the yokes 10. Each upright timber is secured to its sill in a similar manner, and a very substantial rigid frame is thereby easily and quickly erected. The sills and timbers are not weakened by mortises, and no mechanical skill is required to secure the upright timbers in position on the sills or remove them when it is desired to take down the apparatus. The upright timbers may be braced or stayed near their upper ends by any suitable means; but I prefer to provide the cross-timbers 11, secured to the upright timbers by bolts 12, passing through plates 13, provided on the ends of the timbers 11. There are preferably three of the bolts 12, the middle bolt passing through the end of the timber 11 and the other two above and below it, the ends of the plate 13 overlapping the edges of the timber and receiving the ends of the bolts. The cross-timbers 11 hold the upright timbers very rigidly and prevent swaying or twisting of the same, and should the ends of the timbers become split through any unusual strain they will still be held in position by the outer bolts of the series. Above the cross-timbers 11 I provide the long inclined timbers or planking 14, extending from one end of the elevating apparatus to the other and secured to the upright timbers near their upper ends by bolts or in any other suitable way.

At suitable intervals on the timbers 14 I provide hoops 15, adapted to engage the upper edge of the timbers and having horizontal portions 16, projecting into the space between the timbers 14, and whereon planks 17 are secured. These planks 17 form the track or rails upon which the wheels of the wagon roll as it is drawn up the incline. The hooks are preferably arranged opposite each other on the timbers 14, and to further support and strengthen the rails I may turn down the ends of the portions 16 of the opposite hooks, as shown in Fig. 11, forming lugs 18, provided with holes 18' to receive the ends of a rod 19. I prefer to provide this strengthening or bracing rod above the hopper, which I shall presently describe; but, if preferred, rods may be provided at any other point on the frame. Beneath the track-rails at a suitable height to allow the material to flow freely into the car I provide a hopper 20, having its bottom 21 laterally inclined and provided with a spout portion 22, that is adapted to project through the car-door and direct the contents of the hopper into the car. A suitable gate 23 is preferably provided in the spout for controlling the flow of material from the hopper. Above the hopper I prefer to provide the doors or plates 24, adapted to close the space between the opposite track-rails and hinged at their outer edges to said rails and adapted to be folded back over the same to permit access to the hopper. As shown in Fig. 2, the doors 24 are adapted when raised and turned back to bear upon the rear wheels of the wagon and be supported thereby at an incline and act as guide-boards to direct the material that flows from the wagon-box into the hopper. These plates or doors thus serve a double purpose in closing and concealing the mouth of the hopper and acting as guide-boards to direct the material thereto when the apparatus is in use. As shown in Fig. 2, I may prefer to extend the cross-timbers 11 out beyond the upright timbers at the sides of the frame and arrange thereon planks 25, forming a walk whereon the operator may ascend by the side of the frame and open the tail-board at the point it is desired to discharge the contents of the wagon. The operator may also open the doors 24 and permit the material in the wagon to flow into the hopper.

The frame may be further strengthened and braced by planks 26, bolted to the upright timbers intermediate to the top and bottom thereof. Between the upright timbers at the higher end of the frame I prefer to provide an upright timber 27, projecting above the wagon-track and provided with a hook 28, to which a pulley 29 is attached. A similar pulley 30 is provided between the track-rails at the bottom of the incline.

The elevating apparatus having been set up, the farmer or other person desiring to transfer the load from his wagon to a car unhitches his team from the wagon and attaches it to a rope or cable 31, which passes over the pulleys 29 and 30 and is connected to the pole or axle of the wagon. Upon starting the team the wagon is drawn up the incline until it reaches the desired height. Any suitable means may be provided for locking the wagon in the desired position on the incline, or it may be held by the team while the operator removes the tail-board and allows the contents to flow into the hopper.

In some instances I may desire to dispense with the hopper arranged beneath the track-rails and provide a portable form of hopper, such as is shown in Fig. 3 of the drawings. This hopper consists of a section 32, that is adapted to fit under the rear end of the wagon and provided with a laterally-extending trough or spout 33, from which the grain or other material is discharged into an inclined chute 34, leading into the car-door.

The hopper may be supported on the end of the wagon in any preferred manner; but I have shown a series of clips or hooks 35, adapted to engage the top of the wagon sides and tail-board and provided with straps 36, that are adjustably connected with the edge of the hopper. These straps permit the hopper to be adjusted at any desired angle with respect to the rear end of the wagon and the chute into which the grain or other material is discharged.

The apparatus heretofore described may be readily set up and as easily taken down for removal from place to place. It may be set up beside the track to enable the farmer or other person using the same to load a car with wheat or other grain, vegetables, or fruit without the necessity of shoveling the same out of the wagon-box or handling the material in transferring it from the wagon to the car. After the load is weighed on the scales at the foot of the apparatus the wagon is quickly drawn up the incline and discharged of its contents. As soon as one car is filled the apparatus may be moved opposite another car and the operation repeated. The device is also adapted for use in transferring grain or other farm products from the wagon to a granary or other receptacle, which ordinarily in making a transfer requires shoveling or handling the material loaded on the wagon.

When not in use the apparatus may be taken apart and packed away in compact form until it is needed again. There being no mortises or similar forms of joints between the timbers, it follows that the frame will not be weakened at any point, and the method of bracing and strengthening the timber which I have employed permits me to use timbers of comparatively small dimensions.

Having thus described my invention, I claim as new and desire to secure by Letters Patent—

1. In a device of the class described, the combination, with the sills or longitudinal timbers 2, of the cross-timbers 3 beneath the same, the upright timbers 4 provided on the top of said sills, said upright timbers gradually increasing in length from one end of said sills to the other, means for clamping said upright timbers and said cross-timbers on said sills, planks secured to said upright timbers near the upper ends thereof, hooks provided at intervals on said planks and having horizontal portions 16, planks 17 secured to said horizontal portions 16 and forming inclined track-rails, a cable-and-pulley device provided between said rails for drawing a wagon up over the same, a hopper provided beneath said track-rails at a point intermediate to the top and bottom of the same, a laterally-inclined spout 22 provided on said hopper, and a gate 23 provided in said spout, substantially as described.

2. In a device of the class described, the combination, with the sills 2, of the cross-timbers 3 connecting the same, the upright timbers 4 provided at intervals on the top of said sills, said timbers 4 gradually increasing in length from one end of said sills to the other, means for securing said upright timbers to said sills, planks 14 secured to said upright timbers near the upper ends thereof, planks 17 supported on said planks 14 and forming inclined track-rails, a hopper provided beneath said planks 17 at a point intermediate to the ends of the same, a spout 22 forming a lateral extension of said hopper, doors 24 hinged on said planks 17 and covering the top of said hopper and acting as guide-boards therefor when open, a pulley provided near the top of said track-rails, a second pulley near the bottom of the same, and a cable passing over said pulleys and adapted to be connected to a wagon and to a suitable source of power, substantially as described.

3. In a device of the class described, the combination, with the upright timbers, of the planks 14 secured on edge at an incline thereon, the hooks 15 provided at intervals on said planks, said hooks having horizontal extensions 16 provided with lugs 18, rods 19 connecting said lugs 18, and planks 17 provided on said horizontal extensions 16, for the purpose specified.

4. In a device of the class described, the combination, with the inclined track-rails, of the hopper supported beneath the same, the laterally-extending spout provided on said hopper and adapted to conduct the material therefrom to a freight-car, the hinged doors 24 provided between the track-rails and adapted when closed to cover the mouth of the hopper and close the space between said rails and said doors when open being adapted to stand at an incline, and form guide-boards to direct the material into said hopper, substantially as described.

5. In a device of the class described, the combination, with the sills 2, of the cross-timbers 3 beneath the same, the yokes 10 wherein the ends of said cross-timbers are supported, the upright timbers 4 provided at intervals on the top of said sills, said upright timbers gradually increasing in length from one end of said sills to the other, the plates 5 secured near the lower ends of said upright timbers, the lugs 7 formed near the lower ends of said plates, the ends 8 provided on said plates and adapted to project beyond the lower ends of said upright timbers and engage the top of said sills, and bolts 9 adapted to pass through said lugs said sills and the ends of said yokes, whereby said cross and said upright timbers are securely clamped to said sills, substantially as described.

6. In a device of the class described, the combination, with the sills, of the upright timbers provided at intervals thereon, said upright timbers gradually increasing in length from one end to the other of said sills, the plates 5 provided near the lower ends of said timbers and having laterally-extending lugs 7 and ends 8 projecting beyond the ends of said timbers, bolts 9 passing through said lugs and through said sills, whereby said ends 8 are forced into the top of said sills and said upright timbers securely locked thereon, substantially as described.

7. In a device of the class described, the combination, with the sills 2, of the cross-timbers 3 provided beneath the same, the upright timbers 4 provided at intervals on the top of said sills, said upright timbers gradually increasing in length from one end of the sills to the other, means for clamping said cross-timbers and said upright timbers on said sills, the planks 14 secured to said upright timbers near their upper ends, hooks 15 provided at intervals on said planks 14 and having horizontal extensions 16, the planks 17 secured on said horizontal extensions 16 forming inclined rails or trackways, the pulleys 29 and 30 provided at the top and bottom of said track-rails, a rope or cable 31 passing over the same and connected to a wagon and to a suitable source of power, and a suitable hopper adapted to receive the material from a wagon standing on said inclined trackway, substantially as described.

8. The combination, with the sills and the cross-timbers provided between the same, of the upright timbers provided at intervals on said sills, means for removably clamping said upright timbers thereon, an inclined track supported upon said upright timbers, a hopper provided beneath said inclined track and having a laterally-extending spout to deposit the material from said hopper at one side of the track, pulleys provided near the top and bottom of said inclined track, and a rope or cable passing over said pulleys and adapted to be connected to a wagon and a suitable source of power, whereby the wagon may be drawn up said track and its contents discharged into said hopper, substantially as described.

In witness whereof I have hereunto set my hand this 24th day of July, 1900.

BUDD REEVE.

In presence of—
RICHARD PAUL,
M. C. NOONAN.